(12) United States Patent
Chen

(10) Patent No.: US 8,127,909 B2
(45) Date of Patent: Mar. 6, 2012

(54) NORMALLY CLOSED HUB ASSEMBLY FOR BICYCLE

(75) Inventor: Ching-Shu Chen, Changhua (TW)

(73) Assignee: Chosen Co., Ltd., Changhua Hsien (TW)

( * ) Notice: Subject to any disclaimer, the term of this patent is extended or adjusted under 35 U.S.C. 154(b) by 276 days.

(21) Appl. No.: 12/644,574

(22) Filed: Dec. 22, 2009

(65) Prior Publication Data

US 2011/0148183 A1    Jun. 23, 2011

(51) Int. Cl.
*F16D 41/30* (2006.01)
(52) U.S. Cl. ............ 192/64; 192/46; 74/576; 301/110.5
(58) Field of Classification Search ............... 192/64; 74/576
See application file for complete search history.

(56) References Cited

U.S. PATENT DOCUMENTS

| | | | | |
|---|---|---|---|---|
| 756,086 A | * | 3/1904 | Weiler | 192/46 |
| 1,883,966 A | * | 10/1932 | Krause | 74/576 |
| 6,155,394 A | * | 12/2000 | Shook | 192/46 |
| 6,202,813 B1 | * | 3/2001 | Yahata et al. | 192/64 |
| 2010/0252389 A1 | * | 10/2010 | French | 192/64 |

FOREIGN PATENT DOCUMENTS

JP         56-164232    * 12/1981

* cited by examiner

*Primary Examiner* — Richard M. Lorence
(74) *Attorney, Agent, or Firm* — Alan Kamrath; Kamrath IP Lawfirm, PA

(57) ABSTRACT

A hub assembly for a bicycle includes a shaft (12), a hub body (40), a driven ring (43), a drive seat (10), a rotation ring (20), a plurality of pawl members (22), a plurality of push balls (23), a mounting sleeve (32), a damping ring (30), and a plurality of tension adjusting mechanisms (37). Thus, each of the pawl members is driven by each of the push balls in a rolling manner so that each of the pawl members is moved smoothly and stably without incurring sliding friction, thereby facilitating operation of the drive seat. In addition, each of the tension adjusting mechanisms is used to adjust the damping force of the damping ring, so that the damping force of the damping ring is distributed evenly.

9 Claims, 10 Drawing Sheets

NORMALLY CLOSED HUB ASSEMBLY FOR BICYCLE

BACKGROUND OF THE INVENTION

1. Field of the Invention

The present invention relates to a hub and, more particularly, to a normally closed soundless ratchet hub assembly for a bicycle.

2. Description of the Related Art

A conventional hub assembly for a bicycle in accordance with the prior art shown in FIGS. 9 and 10 comprises a shaft 53, a hub body 80 rotatably mounted on the shaft 53, a driven ring 82 secured in the hub body 80 to drive the hub body 80 to rotate relative to the shaft 53 and having an inner wall provided with a plurality of oneway ratchet teeth 81, a drive seat 50 rotatably mounted on the shaft 53 and having an end face provided with a plurality of drive blocks 51 each having a surface provided with an oblique driving slot 52, a support ring 54 secured on the drive seat 50 and protruding from the drive blocks 51, a rotation ring 61 mounted on the support ring 54 and having a periphery provided with a plurality of receiving slots 611, a plurality of pawl members 62 each pivotally mounted in a respective one of the receiving slots 611 of the rotation ring 61 to releasably mesh with the oneway ratchet teeth 81 of the driven ring 82 and each having a side provided with a guide post 621 which is movable in the driving slot 52 of a respective one of the drive blocks 51, a mounting sleeve 74 mounted on the shaft 53, a limit ring 70 mounted on the mounting sleeve 74 and attached to the rotation ring 61 to rotate in concert with the rotation ring 61, a damper 73 mounted on the mounting sleeve 74 and pressing the limit ring 70 to damp a rotation movement of the rotation ring 61, and an elastic member 63 mounted on the rotation ring 61 and pressing each of the pawl members 62 to detach each of the pawl members 62 from the oneway ratchet teeth 81 of the driven ring 82 at a normal state.

The drive seat 50 has an outer surface provided with a plurality of axially extending fixing channels 55 for mounting at least one sprocket (not shown). The driving slot 52 of each of the drive blocks 51 has an outer side 522 and an inner side 521. The rotation ring 61 has an inner portion provided with a mounting hole 64 rotatably mounted on the support ring 54. Each of the pawl members 62 has a first end provided with an enlarged pivot shaft 622 pivotally mounted in the respective receiving slot 611 of the rotation ring 61 and a second end provided with a locking detent 623 which is movable with the guide post 621 to mesh with or detach from the oneway ratchet teeth 81 of the driven ring 82. The locking detent 623 of each of the pawl members 62 is in line with the guide post 621. The limit ring 70 has an inner portion provided with a stepped receiving hole 72 mounted on the mounting sleeve 74 to receive the damper 73. The limit ring 70 is located between the support ring 54 and the mounting sleeve 74. The damper 73 is secured in the receiving hole 72 of the limit ring 70 and is located between the limit ring 70 and the mounting sleeve 74. The damper 73 is made of a resilient material and has an inner wall 730 closely fit onto the mounting sleeve 74 and an outer wall 732 pressing the limit ring 70 to provide a damping force to a rotation movement of the limit ring 70. The mounting sleeve 74 is inserted into the drive seat 50 and is located between the drive seat 50 and the hub body 80.

In assembly, the hub body 80 is connected to a wheel (not shown) of the bicycle, the shaft 53 is connected to a frame (not shown) of the bicycle, and the sprocket on the drive seat 50 meshes with and is driven by a chain (not shown) which is driven by a chainwheel (not shown) which is driven by a pedal (not shown) that is pedalled by a rider. Thus, each of the pawl members 62 is initially pressed inward by the elastic member 63 to disengage the oneway ratchet teeth 81 of the driven ring 82, so that the driven ring 82 is released from and non-rotatable with the drive seat 50 at a normal state. At this time, the guide post 621 of each of the pawl members 62 is located at the inner side 521 of the driving slot 52 of the respective drive block 51.

In operation, when the pedal is pedalled by the rider, the chainwheel is driven by the pedal to drive the chain which drives the sprocket of the drive seat 50 so as to rotate the drive seat 50 forward, so that the drive seat 50 is rotated forward relative to the shaft 53, and the drive blocks 51 of the drive seat 50 are also rotated forward relative to the shaft 53. At this time, the damper 73 provides a damping force to the rotation movement of the limit ring 70 so that the rotation ring 61 and the limit ring 70 will not be rotated with the drive blocks 51 of the drive seat 50. In such a manner, when the drive blocks 51 of the drive seat 50 are rotated forward relative to the shaft 53, the guide post 621 of each of the pawl members 62 is moved from the inner side 521 to the outer side 522 of the driving slot 52 of the respective drive block 51, and each of the pawl members 62 is pivoted outwardly relative to the respective receiving slot 611 of the rotation ring 61, so that the locking detent 623 of each of the pawl members 62 is also moved outwardly to mesh with the oneway ratchet teeth 81 of the driven ring 82. Thus, the driven ring 82 is combined with the rotation ring 61 and the drive blocks 51 of the drive seat 50 by the pawl members 62, so that when the drive seat 50 is rotated forward relative to the shaft 53, the driven ring 82 is driven by the drive seat 50 to drive the hub body 80 to rotate forward relative to the shaft 53 so as to move the wheel forward.

On the contrary, when the pedal is pedalled by the rider to move backward, the chainwheel is driven by the pedal to drive the chain which drives the sprocket of the drive seat 50 so as to rotate the drive seat 50 backward relative to the shaft 53, so that the drive seat 50 is rotated backward relative to the shaft 53, and the drive blocks 51 of the drive seat 50 are also rotated backward relative to the shaft 53. At this time, the damper 73 provides a damping force to the rotation movement of the limit ring 70 so that the rotation ring 61 and the limit ring 70 will not be rotated with the drive blocks 51 of the drive seat 50. In such a manner, when the drive blocks 51 of the drive seat 50 are rotated backward relative to the shaft 53, the guide post 621 of each of the pawl members 62 is moved from the outer side 522 to the inner side 521 of the driving slot 52 of the respective drive block 51, and each of the pawl members 62 is pivoted inwardly to retract into the respective receiving slot 611 of the rotation ring 61, so that the locking detent 623 of each of the pawl members 62 is also moved inwardly to disengage the oneway ratchet teeth 81 of the driven ring 82. Thus, the driven ring 82 is released from the rotation ring 61 and the drive blocks 51 of the drive seat 50 by the pawl members 62, so that when the drive seat 50 is rotated backward relative to the shaft 53, the driven ring 82 together with the hub body 80 is not driven by the drive seat 50, and the drive seat 50 idles.

Thus, when the drive seat 50 is rotated backward by the pedal, each of the pawl members 62 is retracted into the respective receiving slot 611 of the rotation ring 61, and the locking detent 623 of each of the pawl members 62 disengages the oneway ratchet teeth 81 of the driven ring 82 constantly, so that each of the pawl members 62 will not touch the driven ring 82 when the pedal is driven backward to prevent from producing a noise when the pedal is driven backward. In addition, each of the pawl members 62 is separated from the driven ring 82 when the pedal is driven backward so that the hub body 80 is separated from the drive seat 50, and a backward rotation of the hub body 80 will not drive the drive seat 50 and the pedal to prevent the pedal from being driven when the hub body 80 is rotated backward.

However, a sliding friction is produced between the guide post 621 of each of the pawl members 62 and the driving slot 52 of the respective drive block 51 during movement of the drive seat 50, so that the drive seat 50 is not operated smoothly and stably. In addition, the damper 73 is made of an annular elastic plate so that the damper 73 has an unevenly distributed tension and easily produces an elastic fatigue.

BRIEF SUMMARY OF THE INVENTION

In accordance with the present invention, there is provided a hub assembly for a bicycle, comprising a shaft, a hub body rotatably mounted on the shaft, a driven ring secured in the hub body and having an inner wall provided with a plurality of oneway ratchet teeth, a drive seat rotatably mounted on the shaft, a drive ring secured on the drive seat and having a periphery provided with a plurality of pressing grooves, a rotation ring mounted on the drive ring and having a periphery provided with a plurality of receiving slots, a plurality of pawl members each pivotally mounted in a respective one of the receiving slots of the rotation ring to releasably mesh with the oneway ratchet teeth of the driven ring, a plurality of push balls each movably mounted on the rotation ring and each biased between a respective one of the pressing grooves of the drive ring and a respective one of the pawl members to push the respective pawl member toward the oneway ratchet teeth of the driven ring, a mounting sleeve mounted on the shaft, a damping ring mounted on the mounting sleeve and attached to the rotation ring to damp a rotation movement of the rotation ring, and a plurality of tension adjusting mechanisms each biased between the damping ring and the mounting sleeve to adjust a damping force of the damping ring.

Each of the receiving slots of the rotation ring has a first end provided with a receiving bore connected between the drive ring and each of the receiving slots. Each of the push balls is movably mounted in a respective one of the receiving bore of the rotation ring and has a first side received in and pressed by the respective one pressing groove of the drive ring and a second side abutting the respective pawl member. The rotation ring is provided with a plurality of positioning pieces. The damping ring has an outer wall provided with a plurality of positioning recesses to fix the positioning pieces of the rotation ring respectively. The damping ring has a periphery provided with a plurality of threaded receiving holes connected to the mounting sleeve to receive the tension adjusting mechanisms respectively. Each of the tension adjusting mechanisms includes a pressing ball movably mounted in the respective receiving hole of the damping ring and pressing an outer wall of the mounting sleeve, an adjusting screw screwed into the respective receiving hole of the damping ring and a push spring mounted in the respective receiving hole of the damping ring and biased between the pressing ball and the adjusting screw. The hub body has an inner portion provided with a receiving space to receive the rotation ring and the damping ring.

According to the primary objective of the present invention, each of the pawl members is driven by each of the push balls in a rolling manner so that each of the pawl members is moved smoothly and stably without incurring sliding friction to prevent each of the pawl members from being rubbed or worn out, thereby facilitating operation of the drive seat, and thereby enhancing the lifetime of each of the pawl members.

According to another objective of the present invention, each of the tension adjusting mechanisms is used to adjust the damping force of the damping ring, so that the damping force of the damping ring is distributed evenly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
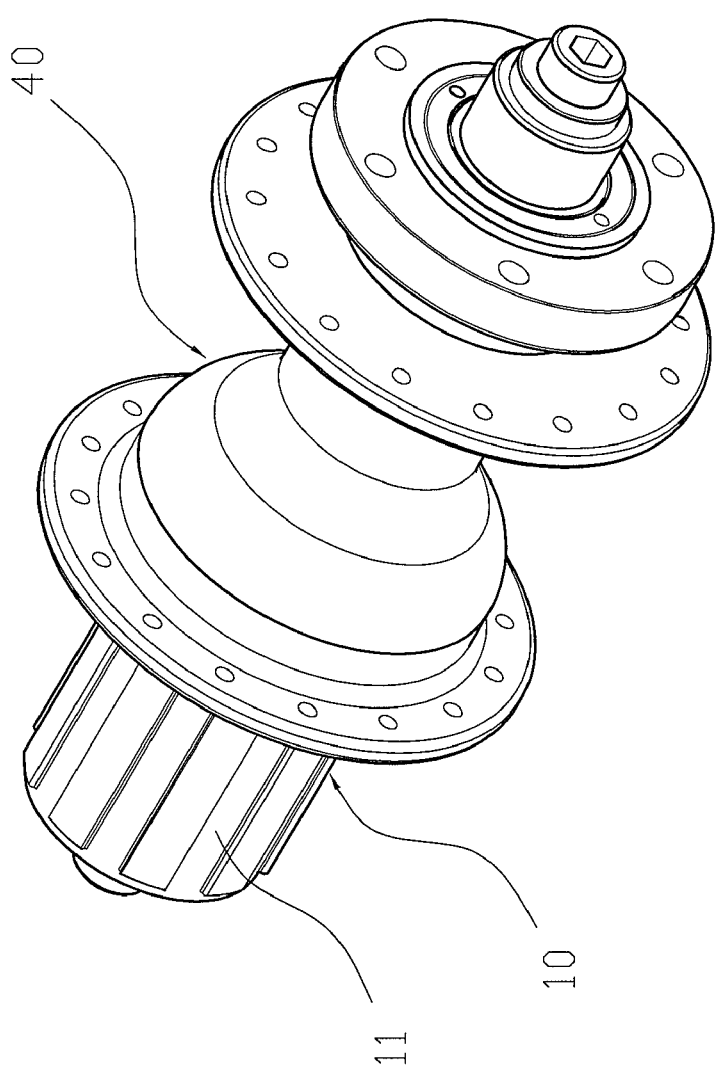
FIG. 1 is a perspective view of a hub assembly for a bicycle in accordance with the preferred embodiment of the present invention.

Referring to the drawings and initially to FIGS. 1-5, a normally closed soundless hub assembly for a bicycle in accordance with the preferred embodiment of the present invention comprises a shaft 12, a hub body 40 rotatably mounted on the shaft 12, a driven ring 43 secured in the hub body 40 to drive the hub body 40 to rotate relative to the shaft 12 and having an inner wall provided with a plurality of oneway ratchet teeth 42, a drive seat 10 rotatably mounted on the shaft 12, a drive ring 13 secured on the drive seat 10 to move in concert with the drive seat 10 and having a periphery provided with a plurality of pressing grooves 131, a rotation ring 20 mounted on the drive ring 13 and having a periphery provided with a plurality of receiving slots 21, a plurality of pawl members 22 each pivotally mounted in a respective one of the receiving slots 21 of the rotation ring 20 to releasably mesh with the oneway ratchet teeth 42 of the driven ring 43, a plurality of push balls 23 each movably mounted on the rotation ring 20 and each biased between a respective one of the pressing grooves 131 of the drive ring 13 and a respective one of the pawl members 22 to push the respective pawl member 22 toward the oneway ratchet teeth 42 of the driven ring 43, a mounting sleeve 32 mounted on the shaft 12, a damping ring 30 frictionally mounted on the mounting sleeve 32 and attached to the rotation ring 20 to damp a rotation movement of the rotation ring 20, a plurality of tension adjusting mechanisms 37 each biased between the damping ring 30 and the mounting sleeve 32 to adjust a damping force of the damping ring 30, and an elastic member 26 mounted on the rotation ring 20 and pressing each of the pawl members 22 to detach each of the pawl members 22 from the oneway ratchet teeth 42 of the driven ring 43 at a normal state.

The drive seat 10 has an inner portion provided with a stepped shaft hole 16 rotatably mounted on the shaft 12 by at least one bearing 101. The drive seat 10 has an end face provided with a plurality of limit lugs 14 and a plurality of limit slots 15 located between the limit lugs 14 respectively. The drive seat 10 has an annular outer surface provided with a plurality of axially extending fixing channels 11 for mounting at least one sprocket (not shown). Alternatively, the sprocket is integrally formed on the drive seat 10.

The rotation ring 20 has an inner portion provided with a mounting hole 28 rotatably mounted on the drive ring 13. Each of the receiving slots 21 of the rotation ring 20 has a first end provided with a receiving bore 212 connected between the mounting hole 28 and each of the receiving slots 21 and a second end provided with a pivot hole 211. The rotation ring 20 is provided with a plurality of positioning pieces 27 directed toward the damping ring 30. The rotation ring 20 is also provided with a plurality of limit ribs 24 which are movable in the limit slots 15 of the drive seat 10 respectively and are limited between the limit lugs 14 of the drive seat 10 respectively. The rotation ring 20 has an outer surface provided with an annular retaining groove 25 to retain the elastic member 26. The retaining groove 25 of the rotation ring 20 has a bottom wall provided with a fixing hole 251.

Each of the pawl members 22 has a first end provided with an enlarged pivot shaft 221 pivotally mounted in the pivot hole 211 of the respective receiving slot 21 of the rotation ring 20 and a second end provided with a locking detent 224 which is movable by a respective one of the push balls 23 to mesh with the oneway ratchet teeth 42 of the driven ring 43. Each of the pawl members 22 has an outer surface provided with an elongate limit groove 223 to receive the elastic member 26. Each of the pawl members 22 has a side provided with a limit post 222 which are movable in the limit slots 15 of the drive seat 10 respectively and are limited between the limit lugs 14 of the drive seat 10 respectively.

Each of the push balls 23 is movably mounted in a respective one of the receiving bore 212 of the rotation ring 20 and has a first side received in and pressed by the respective one pressing groove 131 of the drive ring 13 and a second side abutting the locking detent 224 of the respective pawl member 22 to push the locking detent 224 of the respective pawl member 22 toward the oneway ratchet teeth 42 of the driven ring 43.

The elastic member 26 has a substantially C-shaped profile and has a side provided with an opening 262. The opening 262 of the elastic member 26 has an end provided with a bent fixing portion 261 inserted into the fixing hole 251 of the rotation ring 20 to fix the elastic member 26 onto the rotation ring 20.

The damping ring 30 abuts the rotation ring 20 and has an outer wall provided with a plurality of positioning recesses 31 to fix the positioning pieces 27 of the rotation ring 20 respectively so that the damping ring 30 is combined with the rotation ring 20. The damping ring 30 has a periphery provided with a plurality of radially extending threaded receiving holes 33 connected to the mounting sleeve 32 to receive the tension adjusting mechanisms 37 respectively.

Each of the tension adjusting mechanisms 37 includes a pressing ball 34 movably mounted in the respective receiving hole 33 of the damping ring 30 and pressing an outer wall of the mounting sleeve 32, an adjusting screw 36 screwed into the respective receiving hole 33 of the damping ring 30 and a push spring 35 mounted in the respective receiving hole 33 of the damping ring 30 and biased between the pressing ball 34 and the adjusting screw 36 to push the pressing ball 34 toward the mounting sleeve 32. The adjusting screw 36 is rotated and moved in the respective receiving hole 33 of the damping ring 30 to adjust the tension of the push spring 35.

The hub body 40 has an inner portion provided with a stepped receiving space 41 rotatably mounted on the shaft 12 by a bearing 401 to receive the rotation ring 20, the damping ring 30 and the mounting sleeve 32. The driven ring 43 is secured in the receiving space 41 of the hub body 40 and surrounds the rotation ring 20 and the pawl members 22.

The mounting sleeve 32 is inserted into the shaft hole 16 of the drive seat 10. The mounting sleeve 32 is located between the bearing 101 of the drive seat 10 and the bearing 401 of the hub body 40 so that the mounting sleeve 32 is located between the drive seat 10 and the hub body 40.

In assembly, the hub body 40 is connected to a wheel (not shown) of the bicycle, the shaft 12 is connected to a frame (not shown) of the bicycle, and the sprocket (not shown) on the drive seat 10 meshes with and is driven by a chain (not shown) which is driven by a chainwheel (not shown) which is driven by a pedal (not shown) that is pedalled by a rider. Thus, each of the pawl members 22 is initially pressed inward by the elastic member 26 to disengage the oneway ratchet teeth 42 of the driven ring 43, so that the driven ring 43 is released from and non-rotatable with the drive seat 10 at a normal state.

Figure 2:
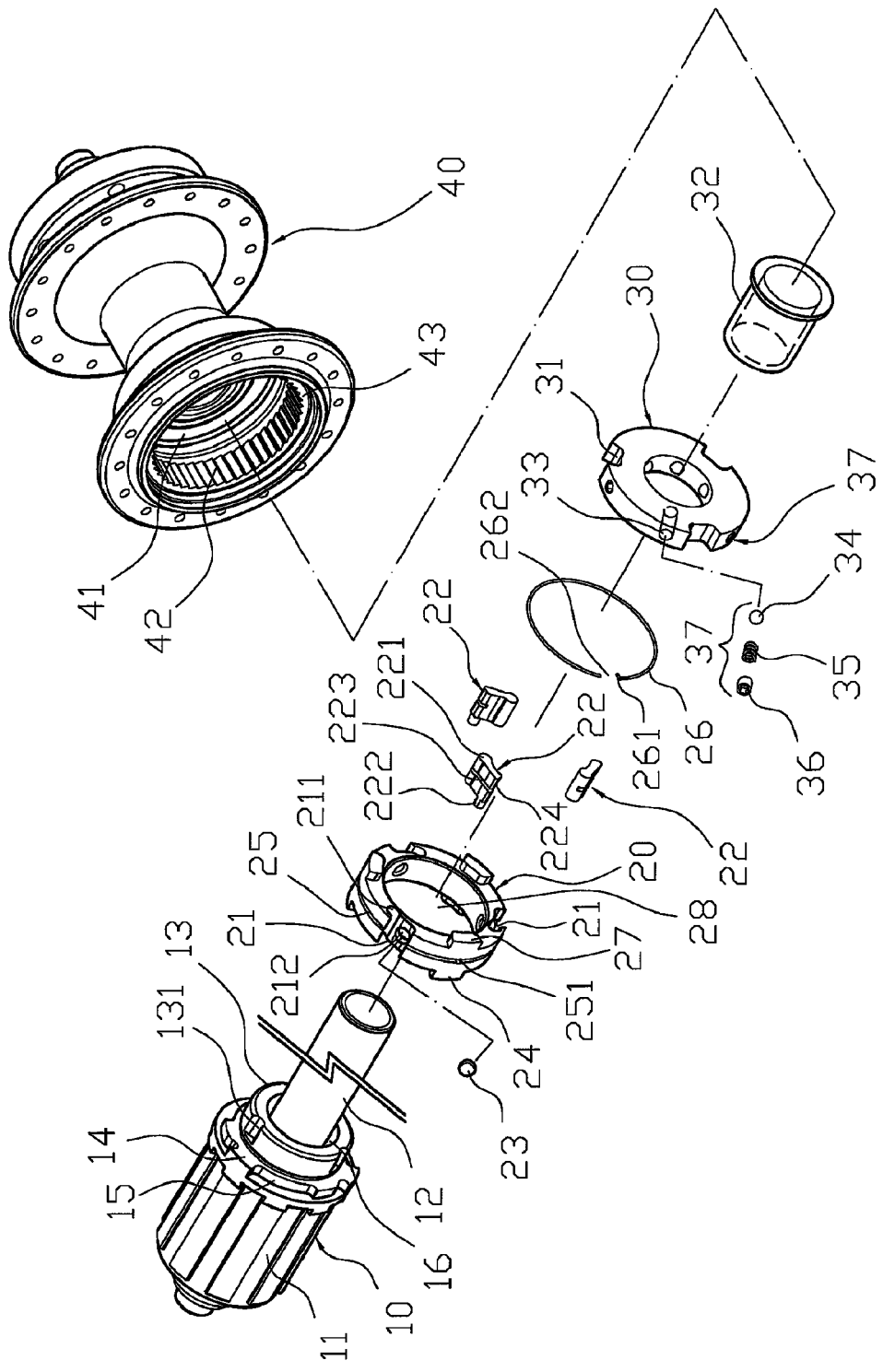
FIG. 2 is an exploded perspective view of the hub assembly as shown in FIG. 1.
Figure 3:
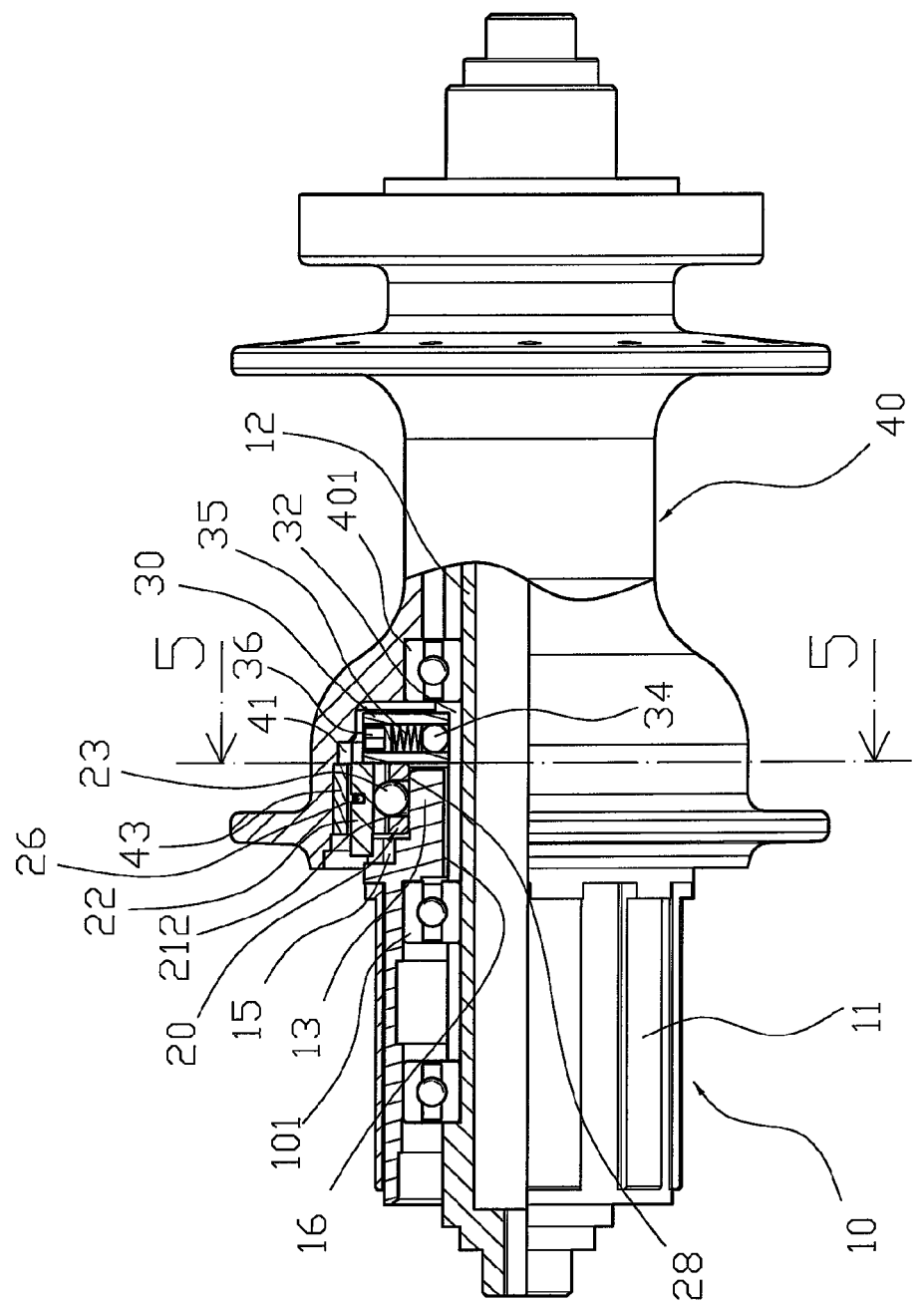
FIG. 3 is a front cross-sectional view of the hub assembly as shown in FIG. 1.
Figure 4:
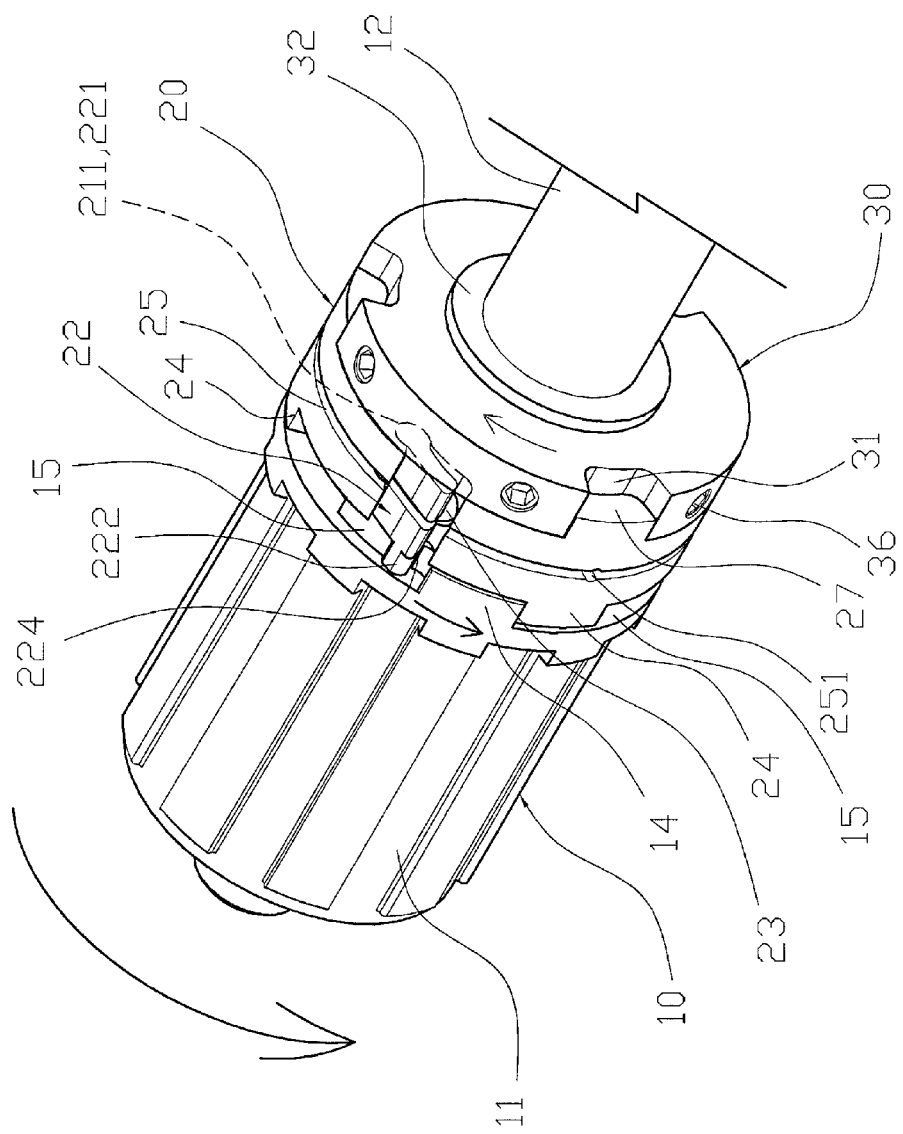
FIG. 4 is a partially perspective view of the hub assembly as shown in FIG. 1.
Figure 5:
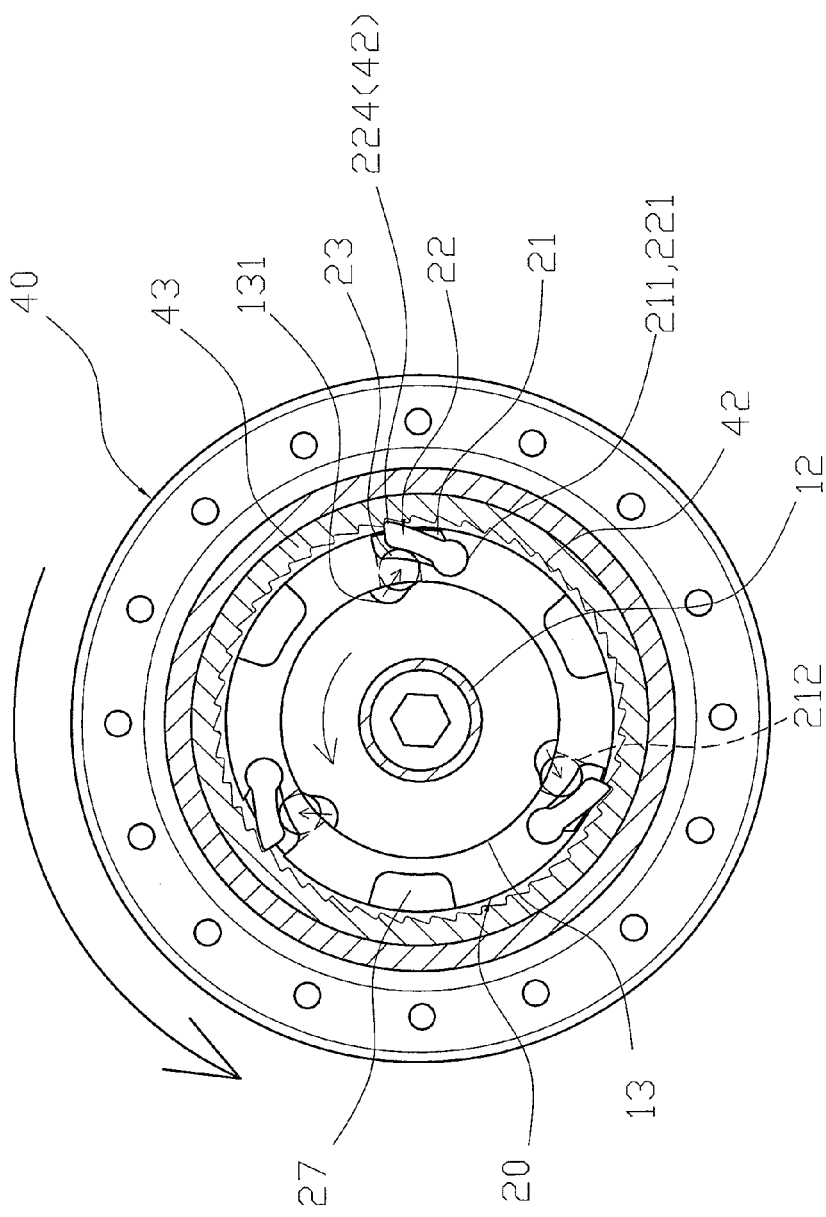
FIG. 5 is a cross-sectional view of the hub assembly taken along line 5-5 as shown in FIG. 3.

In operation, referring to FIGS. 4-7 with reference to FIGS. 1-3, when the pedal is pedalled by the rider, the chainwheel is driven by the pedal to drive the chain which drives the sprocket of the drive seat 10 so as to rotate the drive seat 10 forward, so that the drive seat 10 is rotated forward relative to the shaft 12, and the drive ring 13 is also rotated forward relative to the shaft 12. At this time, the damping ring 30 frictionally mounted on the mounting sleeve 32 provides a damping force to the rotation movement of the rotation ring 20 so that the rotation ring 20 and the damping ring 30 will not be rotated by the drive ring 13. In such a manner, when the drive ring 13 is rotated forward relative to the shaft 12, each of the pressing grooves 131 of the drive ring 13 is moved to press each of the push balls 23 outwardly and to push the locking detent 224 of each of the pawl members 22 to mesh with the oneway ratchet teeth 42 of the driven ring 43 as shown in FIGS. 4 and 5 so that each of the pawl members 22 is combined with the driven ring 43. Thus, the driven ring 43 is combined with the rotation ring 20 and the drive ring 13 by the pawl members 22, so that when the drive seat 10 is rotated forward relative to the shaft 12, the driven ring 43 is driven by the drive seat 10 to drive the hub body 40 to rotate forward relative to the shaft 12 so as to move the wheel forward.

Figure 6:
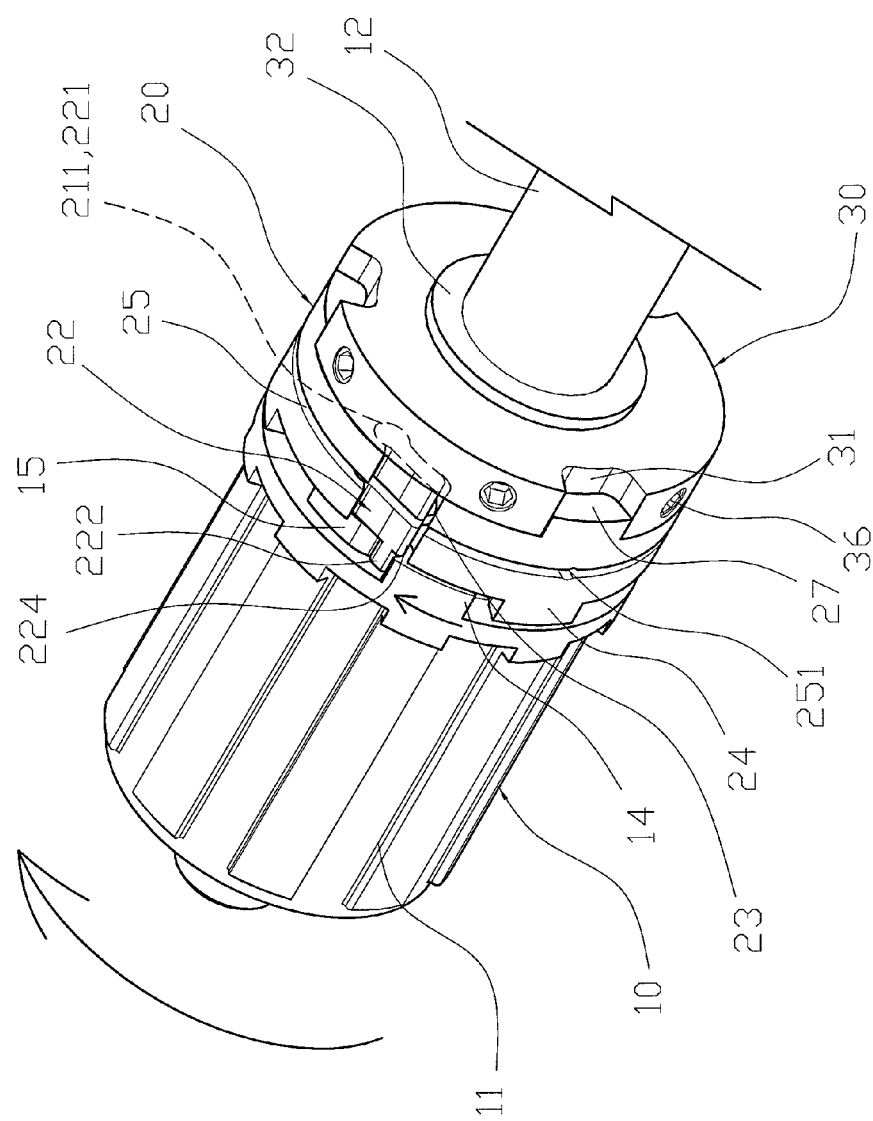
FIG. 6 is a schematic operational view of the hub assembly as shown in FIG. 4.
Figure 7:
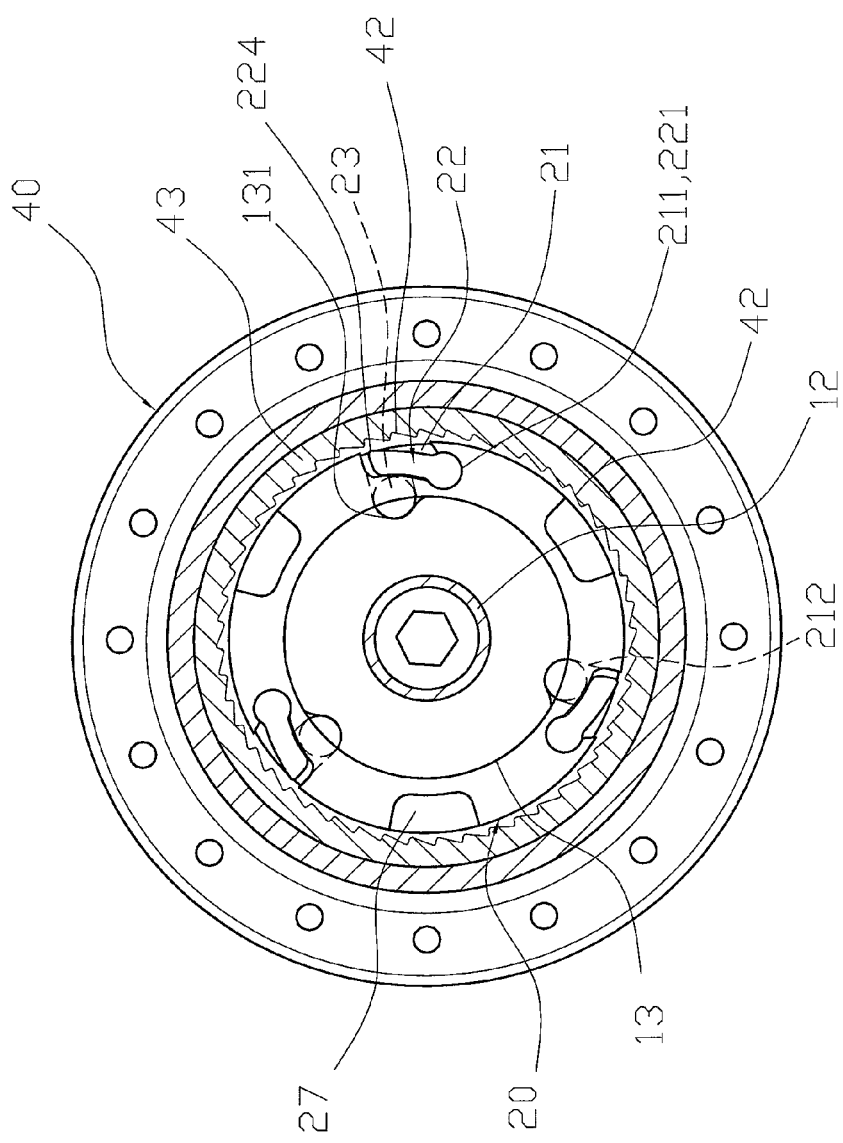
FIG. 7 is a schematic operational view of the hub assembly as shown in FIG. 5.

On the contrary, when the pedal is pedalled by the rider to move backward, the chainwheel is driven by the pedal to drive the chain which drives the sprocket of the drive seat 10 so as to rotate the drive seat 10 backward relative to the shaft 12, so that the drive seat 10 is rotated backward relative to the shaft 12, and the drive ring 13 is also rotated backward relative to the shaft 12. At this time, the damping ring 30 frictionally mounted on the mounting sleeve 32 provides a damping force to the rotation movement of the rotation ring 20 so that the rotation ring 20 and the damping ring 30 will not be rotated by the drive ring 13. In such a manner, when the drive ring 13 is rotated backward relative to the shaft 12, each of the pressing grooves 131 of the drive ring 13 is moved backward to receive and retract each of the push balls 23, and the locking detent 224 of each of the pawl members 22 is pressed inward by the elastic member 26 and is detached from the oneway ratchet teeth 42 of the driven ring 43 as shown in FIGS. 6 and 7 so that each of the pawl members 22 is detached from the driven ring 43. Thus, the driven ring 43 is released from the rotation ring 20 and the drive ring 13 by the pawl members 22, so that when the drive seat 10 is rotated backward relative to the shaft 12, the driven ring 43 together with the hub body 40 is not driven by the drive seat 10, and the drive seat 10 idles.

Thus, when the drive seat 10 is rotated backward by the pedal, each of the pawl members 22 is retracted into the respective receiving slot 21 of the rotation ring 20, and the locking detent 224 of each of the pawl members 22 disengages the oneway ratchet teeth 42 of the driven ring 43 constantly, so that each of the pawl members 22 will not touch the driven ring 43 when the pedal is driven backward to prevent from producing a noise when the pedal is driven backward. In addition, each of the pawl members 22 is separated from the driven ring 43 when the pedal is driven backward so that the hub body 40 is separated from the drive seat 10, and a backward rotation of the hub body 40 will not drive the drive seat 10 and the pedal to prevent the pedal from being driven when the hub body 40 is rotated backward.

Figure 8:
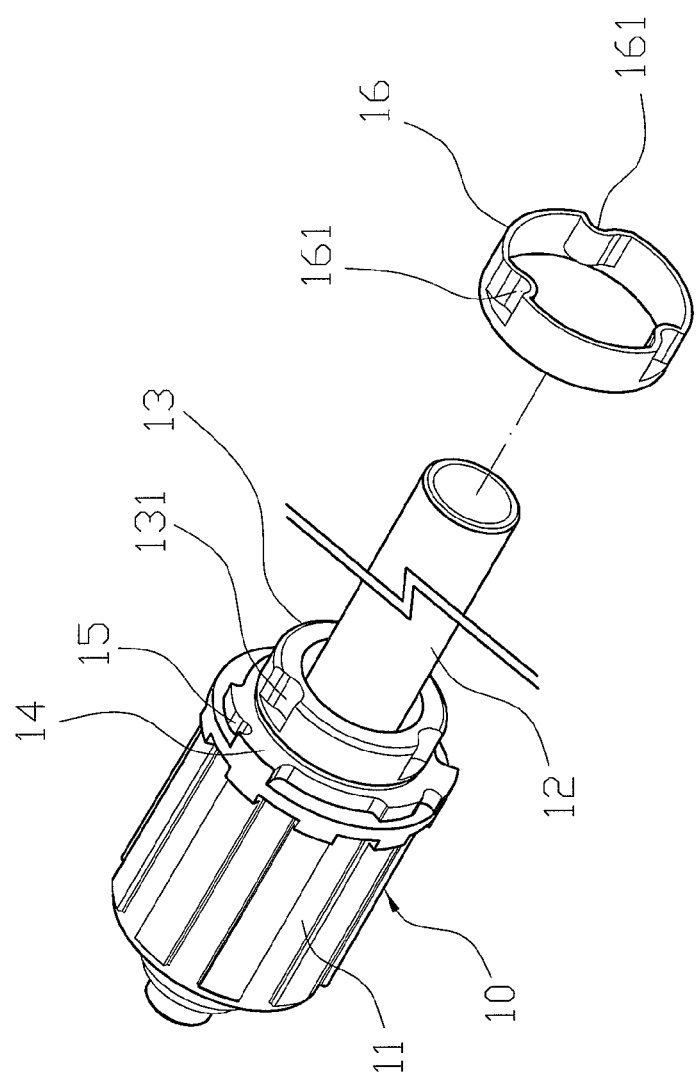
FIG. 8 is a partially exploded perspective view of a hub assembly for a bicycle in accordance with another preferred embodiment of the present invention.
Figure 9:
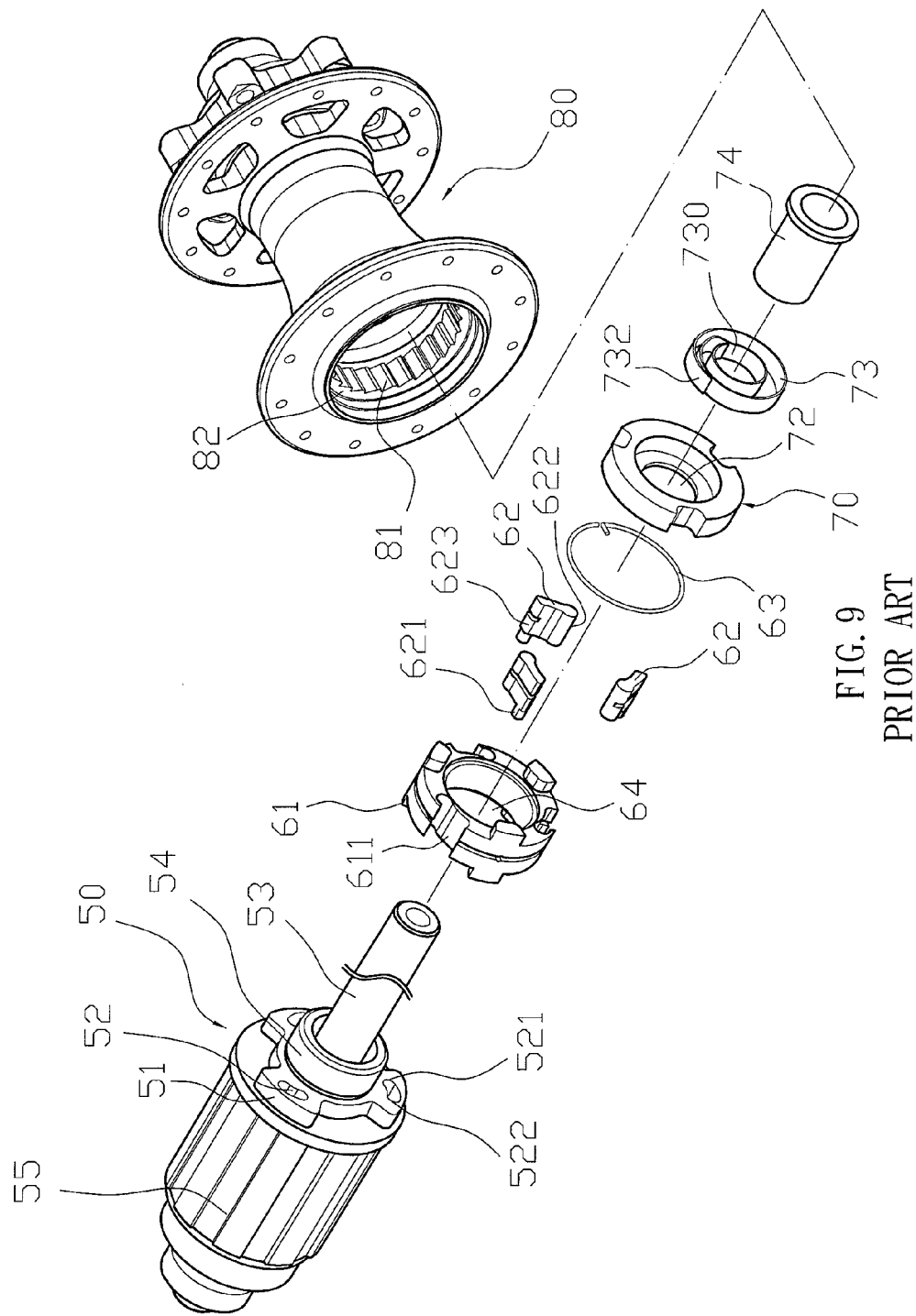
FIG. 9 is an exploded perspective view of a conventional hub assembly for a bicycle in accordance with the prior art.
Figure 10:
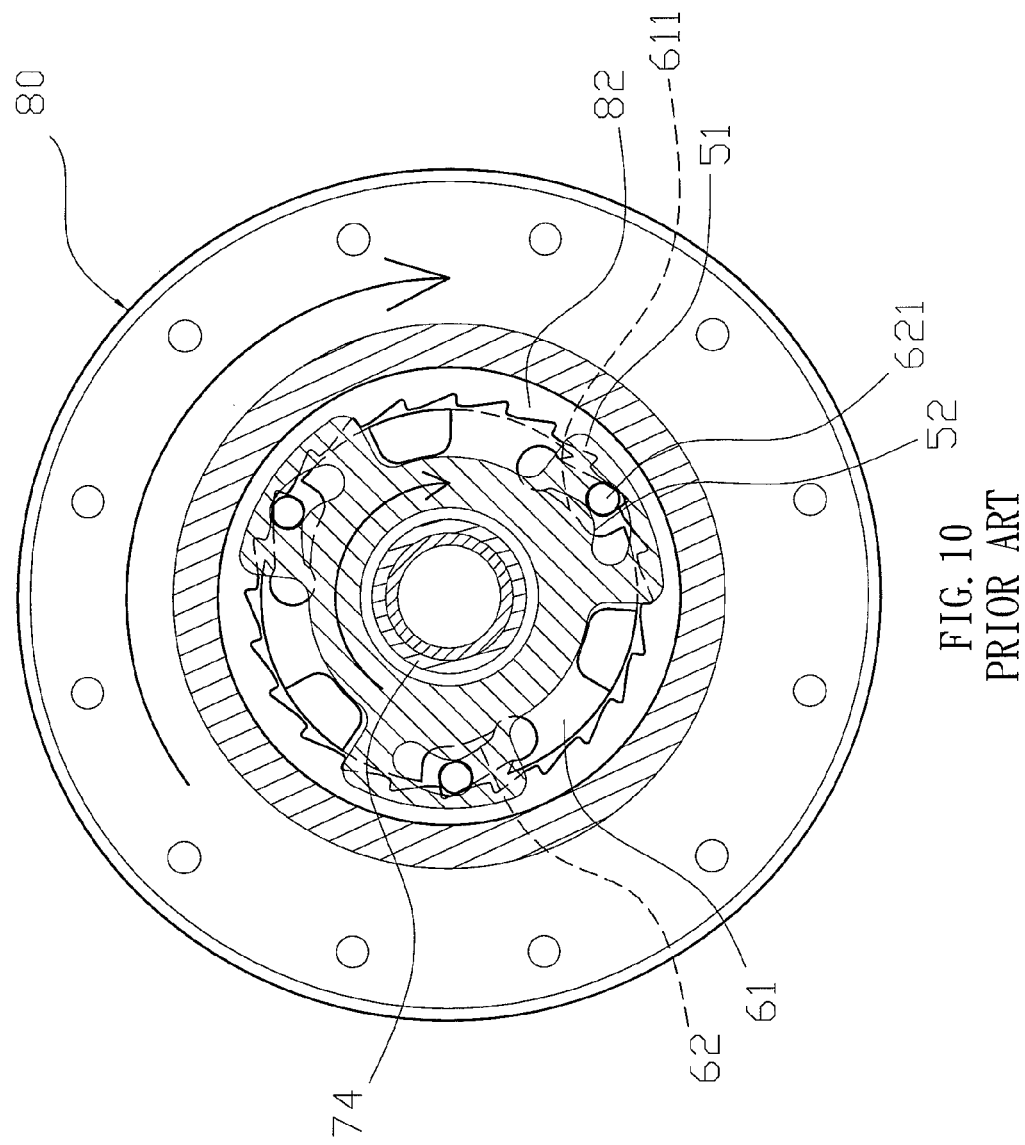
FIG. 10 is a side cross-sectional assembly view of the conventional hub assembly as shown in FIG. 9.

Referring to FIG. 8, the hub assembly further comprises a reinforcing sleeve 16 mounted on the drive ring 13 to reinforce the strength of the drive ring 13. The reinforcing sleeve 16 has a periphery provided with a plurality of pressing recesses 161 aligning with the pressing grooves 131 of the drive ring 13 respectively to receive and press the push balls 23 respectively.

Accordingly, when the drive seat 10 is rotated backward by the pedal, each of the pawl members 22 is retracted into the respective receiving slot 21 of the rotation ring 20 to disengage the oneway ratchet teeth 42 of the driven ring 43, so that each of the pawl members 22 is spaced from and will not touch the driven ring 43 when the pedal is driven backward so as to prevent from producing a noise when the pedal is driven backward. In addition, each of the pawl members 22 is driven by each of the push balls 23 in a rolling manner so that each of the pawl members 22 is moved smoothly and stably without incurring sliding friction to prevent each of the pawl members 22 from being rubbed or worn out, thereby facilitating operation of the drive seat 10, and thereby enhancing the lifetime of each of the pawl members 22. Further, each of the tension adjusting mechanisms 37 is used to adjust the damping force of the damping ring 30, so that the damping force of the damping ring 30 is distributed evenly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A hub assembly for a bicycle, comprising:
a shaft (12);
a hub body (40) rotatably mounted on the shaft;
a driven ring (43) secured in the hub body and having an inner wall provided with a plurality of oneway ratchet teeth (42);
a drive seat (10) rotatably mounted on the shaft;
a drive ring (13) secured on the drive seat and having a periphery provided with a plurality of pressing grooves (131);
a rotation ring (20) mounted on the drive ring and having a periphery provided with a plurality of receiving slots (21);
a plurality of pawl members (22) each pivotally mounted in a respective one of the receiving slots of the rotation ring to releasably mesh with the oneway ratchet teeth of the driven ring;
a plurality of push balls (23) each movably mounted on the rotation ring and each biased between a respective one of the pressing grooves of the drive ring and a respective one of the pawl members to push the respective pawl member toward the oneway ratchet teeth of the driven ring;
a mounting sleeve (32) mounted on the shaft;
a damping ring (30) mounted on the mounting sleeve and attached to the rotation ring to damp a rotation movement of the rotation ring;
a plurality of tension adjusting mechanisms (37) each biased between the damping ring and the mounting sleeve to adjust a damping force of the damping ring;
wherein each of the receiving slots of the rotation ring has a first end provided with a receiving bore (212) connected between the drive ring and each of the receiving slots;
each of the push balls is movably mounted in a respective one of the receiving bore of the rotation ring and has a first side received in and pressed by the respective one pressing groove of the drive ring and a second side abutting the respective pawl member;
the rotation ring is provided with a plurality of positioning pieces (27);
the damping ring has an outer wall provided with a plurality of positioning recesses (31) to fix the positioning pieces of the rotation ring respectively;
the damping ring has a periphery provided with a plurality of threaded receiving holes (33) connected to the mounting sleeve to receive the tension adjusting mechanisms respectively;
each of the tension adjusting mechanisms includes:
a pressing ball (34) movably mounted in the respective receiving hole of the damping ring and pressing an outer wall of the mounting sleeve;
an adjusting screw (36) screwed into the respective receiving hole of the damping ring; and
a push spring (35) mounted in the respective receiving hole of the damping ring and biased between the pressing ball and the adjusting screw;
the hub body has an inner portion provided with a receiving space (41) to receive the rotation ring and the damping ring.

2. The hub assembly of claim 1, wherein the drive seat has an annular outer surface provided with a plurality of axially extending fixing channels (11).

3. The hub assembly of claim 1, wherein
the drive seat has an end face provided with a plurality of limit lugs (14) and a plurality of limit slots (15) located between the limit lugs respectively;
the rotation ring is provided with a plurality of limit ribs (24) which are movable in the limit slots of the drive seat respectively and are limited between the limit lugs of the drive seat respectively.

4. The hub assembly of claim 1, wherein
the drive seat has an end face provided with a plurality of limit lugs and a plurality of limit slots located between the limit lugs respectively;
each of the pawl members has a side provided with a limit post (222) which are movable in the limit slots of the drive seat respectively and are limited between the limit lugs of the drive seat respectively.

5. The hub assembly of claim 1, wherein
each of the receiving slots of the rotation ring has a second end provided with a pivot hole (211);
each of the pawl members has a first end provided with a pivot shaft (221) pivotally mounted in the pivot hole of the respective receiving slot of the rotation ring and a second end provided with a locking detent (224) which is movable by a respective one of the push balls to mesh with the oneway ratchet teeth of the driven ring.

6. The hub assembly of claim 1, wherein the hub assembly further comprises an elastic member (26) mounted on the rotation ring and pressing each of the pawl members to detach each of the pawl members from the oneway ratchet teeth of the driven ring at a normal state;

the rotation ring has an outer surface provided with an annular retaining groove (25) to retain the elastic member;

each of the pawl members has an outer surface provided with an elongate limit groove (223) to receive the elastic member.

7. The hub assembly of claim 6, wherein the retaining groove of the rotation ring has a bottom wall provided with a fixing hole (251);

the elastic member has a side provided with an opening (262);

the opening of the elastic member has an end provided with a bent fixing portion (261) inserted into the fixing hole of the rotation ring to fix the elastic member onto the rotation ring.

8. The hub assembly of claim 1, wherein the drive seat is mounted on the shaft by at least one bearing (101);

the hub body is mounted on the shaft by a bearing (401);

the mounting sleeve is located between the bearing of the drive seat and the bearing of the hub body so that the mounting sleeve is located between the drive seat and the hub body.

9. The hub assembly of claim 1, wherein the hub assembly further comprises a reinforcing sleeve (16) mounted on the drive ring to reinforce the strength of the drive ring;

the reinforcing sleeve has a periphery provided with a plurality of pressing recesses (161) aligning with the pressing grooves of the drive ring respectively to receive and press the push balls respectively.

\* \* \* \* \*